United States Patent [19]

Yarmashev et al.

[11] Patent Number: 4,607,480
[45] Date of Patent: Aug. 26, 1986

[54] AXIAL-FLOW COMBINE

[75] Inventors: Jury N. Yarmashev; Vladimir A. Zapandi; Valentin N. Tkachev, all of Taganrog, U.S.S.R.

[73] Assignee: Glavnoe Spetsializirovannoe Konstruktorskoe Bjuro po Mashinam Uborki Zernovykh Kultur i Samokhodnykh Shassi, Taganrog, U.S.S.R.

[21] Appl. No.: 723,870

[22] Filed: Apr. 16, 1985

[51] Int. Cl.$^4$ ............................................. A01F 12/26
[52] U.S. Cl. .................................. 130/27 T; 130/27 J; 130/27 K
[58] Field of Search ............ 130/27 R, 27 H, 27 HA, 130/27 J, 27 K, 27 L, 27 T; 56/14.6

[56] References Cited

U.S. PATENT DOCUMENTS

| | | | |
|---|---|---|---|
| 3,556,108 | 1/1971 | Knapp et al. | 130/27 T |
| 3,982,549 | 9/1976 | DePauw et al. | 130/27 HA |
| 4,075,823 | 2/1978 | Rowland-Hill | 130/27 K |
| 4,159,023 | 6/1979 | Todd et al. | 130/27 T |
| 4,177,820 | 12/1979 | Rowland-Hill | 130/27 T |
| 4,249,543 | 2/1981 | Rowland-Hill | 130/27 J |
| 4,274,426 | 6/1981 | Williams | 130/27 T |

Primary Examiner—Robert P. Swiatek
Assistant Examiner—David L. Tarnoff
Attorney, Agent, or Firm—Fleit, Jacobson, Cohn & Price

[57] ABSTRACT

A combine for harvesting primarily spiked grains such as wheat, rye, barley, oats, and cereals such as buckwheat. The combine includes a rotating rotor arranged in a stationary casing along the direction of combine movement. An upper part of the casing is provided with helical guide fins mounted on the internal surface thereof. A lower part of the casing in a threshing zone is provided with a grate-type concave mounted under which is a conveyor to transport threshed product separated through the concave to a cleaning mechanism. The concave has openings of different open area and is made such that its portion having the openings of smaller size is located, with respect to the direction of combine movement, between a front edge of the concave and an imaginary extension of a helical line of the guide fins on the concave and enlarges in the direction of rotor rotation.

3 Claims, 5 Drawing Figures

AXIAL-FLOW COMBINE

FIELD OF THE INVENTION

The present invention relates to agricultural machinery industry, and more particularly to an axial-flow combine.

Most advantageously the present invention can be used in harvesting spiked grains such as wheat, rye, barley, oat, and cereals such as buckwheat.

BACKGROUND OF THE INVENTION

At the present time more and more axial-flow combines are used which radically differ from grain combines having a tangential threshing mechanism. In the axial-flow combines the processes of threshing and separating are integrated and intensified so that it is not necessary to install special devices such as straw shakers and agitators to separate residual grain.

The process of threshing and separating crop material in the axial-flow combines is quite different from that in the combines of conventional type. The crop material to be threshed in the axial-flow combine threshing mechanism moves along a helical line parallel to the rotor axis as distinct from the conventional threshing mechanism wherein the crop material moves at right angles to the drum axis.

A longitudinally arranged rotor threshes the oncoming crop material and at the same time causes it to move along a spiral path over a concave surface. The crop material is threshed due to combined beating and rubbing action exerted by working elements of the rotor and bars of the concave upon the processed material.

Tests of the axial flow combine with longitudinally arranged rotor showed its better performance as compared with the conventional combine. Due to its structural features the rate of threshing of the crop material and separation of grain from straw substantially increases; milder operation of the threshing and separating mechanism and use of rubbing action instead of beating action allow the extent of damage to the grain to be considerably reduced, which is especially important for enhancing the sowing quality of grain and for prolonging the storage life of food grain; the number of working elements of the threshing and separating mechanism is substantially reduced as one working element (axial rotor) fulfils functions of receiving and separating beaters, a threshing apparatus and a straw-walker.

Both in harvesting spiked grains and corn the axial-flow combine with the feed of crop material to the threshing and separating mechanism increasingly shows an approximately uniform and linear increase in grain losses behind the thresher, whereas the grain losses in the combine having a straw-walker increase progressively.

While featuring the above advantages, the axial-flow combine with the longitudinally arranged rotor has, however, a characteristic disadvantage residing in an offset of the grain threshed and passed through the concave to one side from the longitudinal axis thereof, and as a result a cleaning mechanism is unevenly loaded over its width which brings about grain losses behind said mechanism and a decrease in total grain output of the combine. This disadvantage is caused by that the crop material being threshed, when moving along a helical path in the threshing zone, is subjected to repeated actions of the rotor working elements and concave bars, which are not equal, and depend on the size of threshing clearance. The rate of sifting the threshed material through an open area of the concave is different. Besides, the grain passing through the concave under the action of centrifugal force is acted upon by two forces in different directions, namely by gravity and a force directed tangentially to the path of threshed material moving along an arc of a circle. Uneven distribution of the threshed grain passing through the concave results in uneven loading of sieves of the cleaning mechanism, which impairs the quality of its operation and decreases the total grain output of the combine.

Known in the art is an axial-flow combine (cf. U.S. Pat. No. 3,982,549, cl. A01 F 12/20) comprising a rotating rotor arranged along the direction of combine movement in a stationary cylindrical casing, an upper part of which mounts spiral guide fins on its internal surface, and its lower part in a threshing zone is provided with a grate-type concave under which is mounted a conveyor to transport threshed product separated through the concave to a cleaning mechanism.

A disadvantage of this prior art axial-flow combine resides in a one-sided offset with respect to its longitudinal axis of the material threshed and separated through the concave, its distribution across the conveyor in a layer of uneven depth and a further transfer of such a layer to a sieve of the cleaning mechanism, as a result of which the sieve is unevenly loaded over its width, the quality of operation of the cleaning mechanism is impaired and the total grain output of the combine is reduced.

One of the conditions for proper operation of the cleaning mechanism both in combines of conventional and axial-flow types is a supply of material in a layer of even depth onto the cleaning mechanism sieve over its width.

An uneven layer of the material moving over the sieve working surface cannot be fully blown through with an air current produced by a blower of the cleaning mechanism, and as a result unseparated grain together with chaffer is discharged from the combine, thereby decreasing the total grain output thereof.

Also known in the art is an axial-flow combine (cf. U.S. Pat. No. 3,556,108, cl. A01 F 12/32) having a transverse distributing means to evenly distribute material carried by a conveyor over a width of a cleaning mechanism sieve. A disadvantage of this axial-flow combine, which is characteristic of all axial flow combines, is a one-sided offset with respect to its longitudinal axis of the material threshed and passed through a concave to the conveyor and its further transfer to the cleaning mechanism, which impairs its operation. The transverse distributing means fails to perform effectively an even distribution of the material over a width of the sieve of the cleaning mechanism, as the material threshed and separated through the concave is distributed unilaterally across the conveyor and supplied in an uneven layer to the transverse distributing means, whose cross auger flightings have a different direction of helix and cannot evenly redistribute the material layer over the cleaning mechanism sieve.

Known in the art is one more axial-flow combine (cf. U.S. Pat. No. 4,177,820, cl. A01 F 12/20) wherein a rotor together with a stationary cylindrical casing and a concave embracing it from above and below, respectively, is offset towards one of the vertical walls of the combine body on the side opposite to the direction of rotor rotation. The opposite vertical wall mounts an angularly adjustable deflector. Although installation of one or even two deflectors (on both vertical walls) facilitates passage and concentration of threshed product separated through the concave near to the conveyor axis of symmetry, it does not provide for its even distribution over a width of the cleaning mechanism sieve.

Thus, the prior art axial-flow combines distribute the threshed product in a layer of uneven depth over a width of the cleaning mechanism sieve, which impairs the proper operation of the cleaning mechanism, brings about unjustified grain losses behind the combine and decreases the total grain output thereof.

SUMMARY OF THE INVENTION

An object of the present invention is to increase the grain output of a combine.

Another object of the present invention is to increase the efficiency of threshing and separating of crop material being processed.

Still another object of the present invention is to reduce grain losses behind the combine.

And yet another object of the present invention is to improve the operation of a cleaning mechanism of the combine.

The above and other objects of the invention are accomplished in that in an axial-flow combine comprising a rotating rotor arranged along the direction of combine movement in a stationary cylindrical casing whose upper part is provided with spiral guide fins mounted on its internal surface, and whose lower part in a threshing zone is provided with a grate-type concave mounted under which is mounted a conveyor to transport threshed product separated through the concave to a cleaning mechanism, according to the invention the concave has openings of different open area and is made such that its portion having the openings of smaller size is located, with respect to the direction of combine movement, between a front edge of the concave and an imaginary extension of a helical line of the guide fins on the concave and enlarges in the direction of rotor rotation.

The axial-flow combine concave of the herein disclosed design makes it possible to evenly distribute the separated grain over a width of the conveyor. Such a design takes into account the following factors: the intensity of sifting of the grain by the concave at the beginning of the threshing zone over the entire wrap angle between the rotor and concave; the path of material being threshed in the threshing zone; the efficiency of operation of the working elements of the rotor and the bars of the concave acting upon the material being threshed, depending on the size of the threshing clearance between the rotor and the concave and the different intensity of sifting of the grain by the concave, and the effect of forces of different magnitude and direction upon the grain passing through the concave under the action of centrifugal force and resulting in one-sided distribution with respect to the rotor axis of the grain separated by the concave over the width of the conveyor.

As a result, operation of the cleaning mechanism is stabilized, total losses of grain behind the combine are reduced and, consequently, the combine grain output increases.

In another embodiment of the invention the concave portion having the openings of smaller size enlarges in the direction of rotor rotation in steps.

The concave of such a design is easy to manufacture.

In a preferred embodiment of the invention the concave portion having the openings of smaller size is made up of two steps arranged on either side of the rotor longitudinal axis and having lengths in the direction of rotor rotation amounting, respectively, to one third and two thirds of a helical line pitch of the guide fins.

The concave of such a design is adaptable to streamlined manufacture and when made of a plurality of removable sections is easy to service and repair.

BRIEF DESCRIPTION OF THE DRAWINGS

Other objects and advantages of the present invention will become apparent from the following detailed description of a specific embodiment thereof taken in conjunction with the accompanying drawings, wherein.

DETAILED DESCRIPTION OF THE INVENTION

Figure 1:
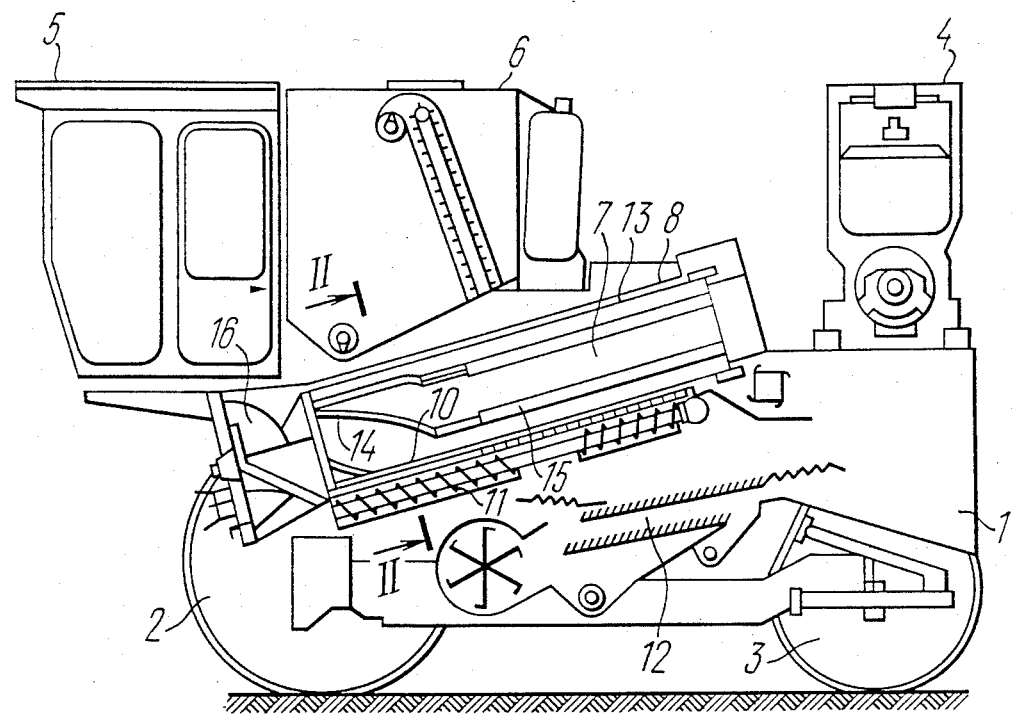
FIG. 1 is a longitudinal schematic view of an axial-flow combine.

An axial-flow combine comprises a body 1 (FIG. 1) supported by drive wheels 2 and steerable wheels 3.

Figure 2:
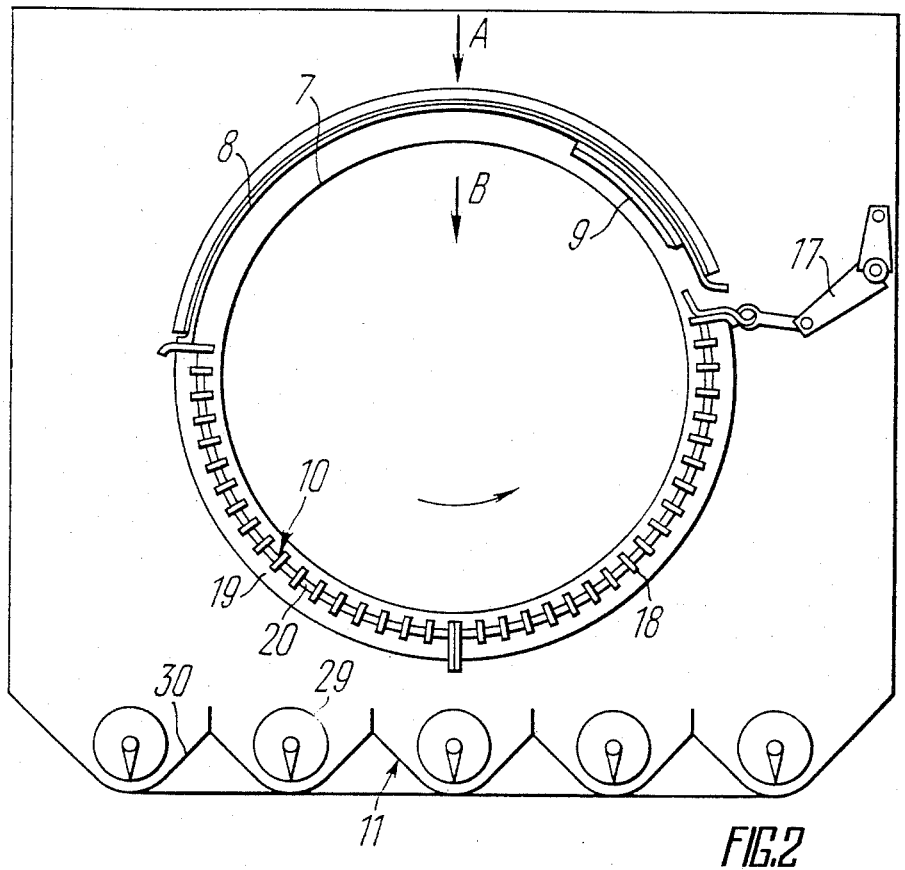
FIG. 2 is a sectional view taken on the line II—II of FIG. 1.

Arranged in the rear upper part of the body 1 is an engine 4 having a transmission to impart motion to working elements of the combine. In the upper front part of the body 1 there is installed a control cab 5 with a grain tank 6 located behind it. The combine comprises a longitudinally arranged rotating rotor 7 enclosed in a stationary cylindrical casing 8 located symmetrically relative to the longitudinal axis of the combine body 1. The upper part of the casing 8 has spiral guide fins 9 (FIG. 2) on the internal surface thereof. The lower part of the casing 8 in a threshing zone has a grate-type concave 10 (FIG. 1) arranged with respect to the rotor 7 in the direction of its rotation with a wedge-like clearance. Mounted under the concave 10 is a conveyor 11 to transport threshed product separated through the concave to a cleaning mechanism 12.

The rotor 7 is essentially a hollow cylinder 13 spirally mounting on the periphery thereof in a front threshing zone helical rasp bars 14 which change into straight or smooth or rasp bars 15 in a rear separating zone. A vaned impeller 16 is installed in front of the rotor 7 on its shaft.

The concave 10 (FIG. 2), associated with a mechanism 17 for adjusting clearances between the concave 10 and the rotor 7, is formed by a plurality of longitudinal bars 18, transverse bars 19 and rods 20.

It is known that the sizes of the openings which make up an open area of the concave are formed by a plurality of bars and rods, and they depend on the kind of crop to be threshed and are determined in the main by the spacing and the cross-sectional area of the rods. To provide for normal threshing and separation of the material, it is a common practice in the world combine building industry to make concaves having the following parameters: the spacing between the rods is from 10.7 to 21.1 mm and the diameter of the rods is from 5 to 8 mm for harvesting spiked grains and cereals; the spacing between the rods is from 21.1 to 32.8 mm and the diameter of the rods is from 6 to 10 mm for harvesting corn, sunflower and beans. According to the invention the sizes of openings making up an open area of the concave, the construction of which ensures a uniform distribution of the separated material over the width of the conveyor, are selected base upon the condition of making the concave from removable sections designed for harvesting spiked grains and cereals, and also for harvesting corn sunflower and beans, and have the following parameters: for smaller openings the spacing between the rods is 10.7 mm, and the diameter is 5 mm; for larger openings the spacing is 21.1 mm and the diameter of the rods is 6 mm.

Figure 3:
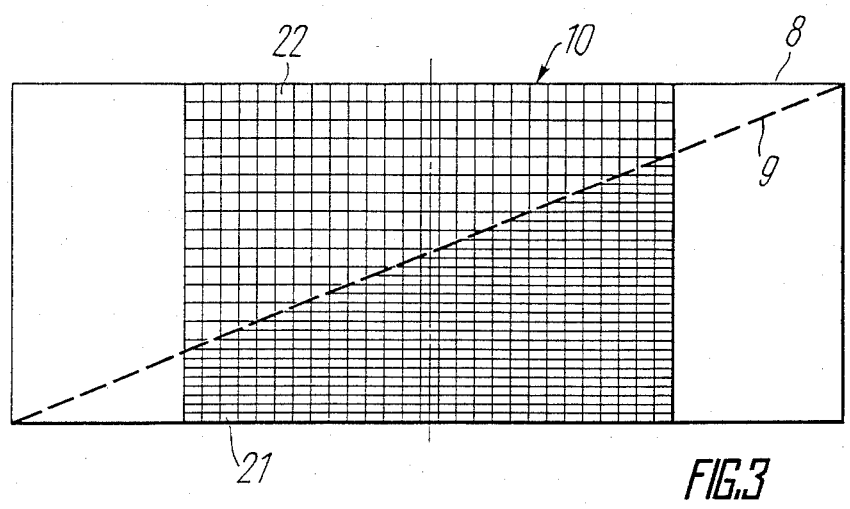
FIG. 3 is a developed view of a casing and concave taken along the arrow A in FIG. 2.
Figure 4:
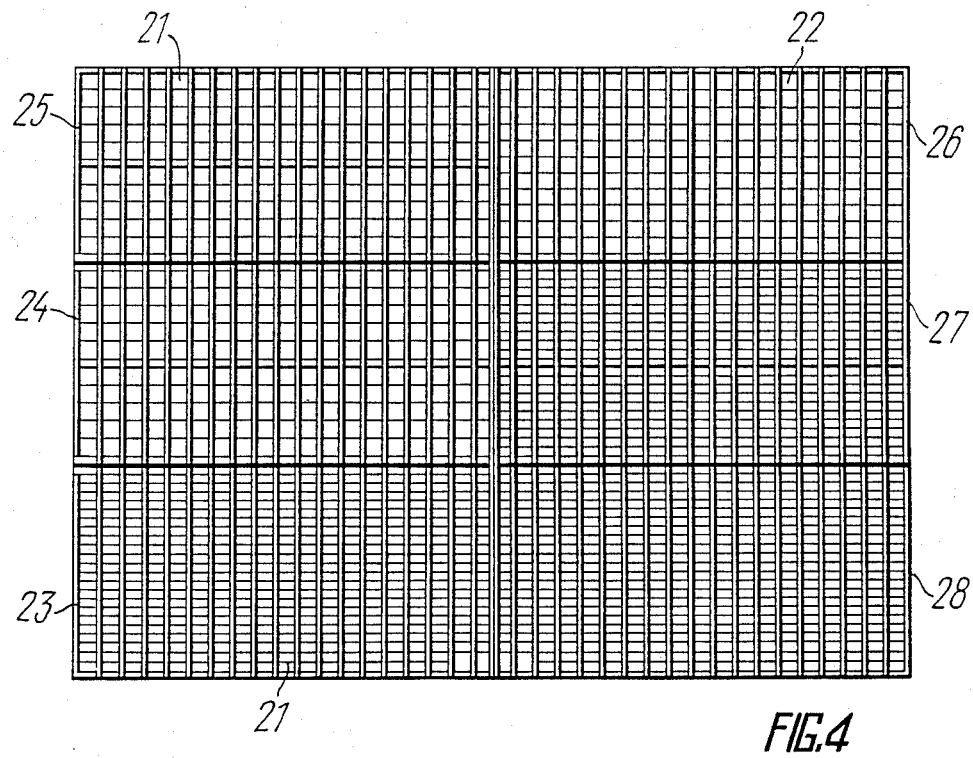
FIG. 4 is a developed view of a concave taken along the arrow B in FIG. 2.

As is seen in FIG. 3, openings 21 making up an open area of the concave 10 are smaller in size than openings 22. A concave portion having openings 21 is defined, with respect to the direction of combine movement, by a front edge of the concave 10 and an imaginary extension of a helical line of the guide fins 9 (a dash line in FIG. 3) on the concave 10. In a preferred embodiment of the invention, the area of the concave portion having the openings 21 of smaller size enlarges in the direction of rotor rotation in steps (FIG. 4). To simplify the construction, the concave portion having the openings 21 of smaller size is made up of two steps arranged on either side of the rotor longitudinal axis and having lengths amounting, respectively, to one third and two thirds of a helical line pitch of the guide fins 9.

For more convinient maintenance and primarily for cleaning of the concave 10 the latter may be made in the form of removable sections 23 through 28 (FIG. 4).

The conveyor 11 (FIG. 2) is made in the form of a plurality of longitudinal augers 29 having conveying grooves 30 thereof interconnected without gaps. The conveyor 11 may be of any other construction, for example a grate type.

The invention operates as follows.

Crop material to be threshed is fed from a heated inclined chamber (not shown in the drawing) to the working area of the impeller 16 to be beaten and partially threshed therein. Due to spiral guide fins (not shown) mounted on the internal surface of a funnel-shaped inlet of the cylindrical casing 8 encompassing the impeller 16, the crop material is caused by the latter to move along a helical line to the theshing zone of the combine.

The helical guide fins 9 of the stationary cylindrical casing 8, helical bars 14 and straight bars 15 of the rotating rotor 7 provide the conditions for axial and helical transfer of the crop material towards the outlet from the combine.

Figure 5:
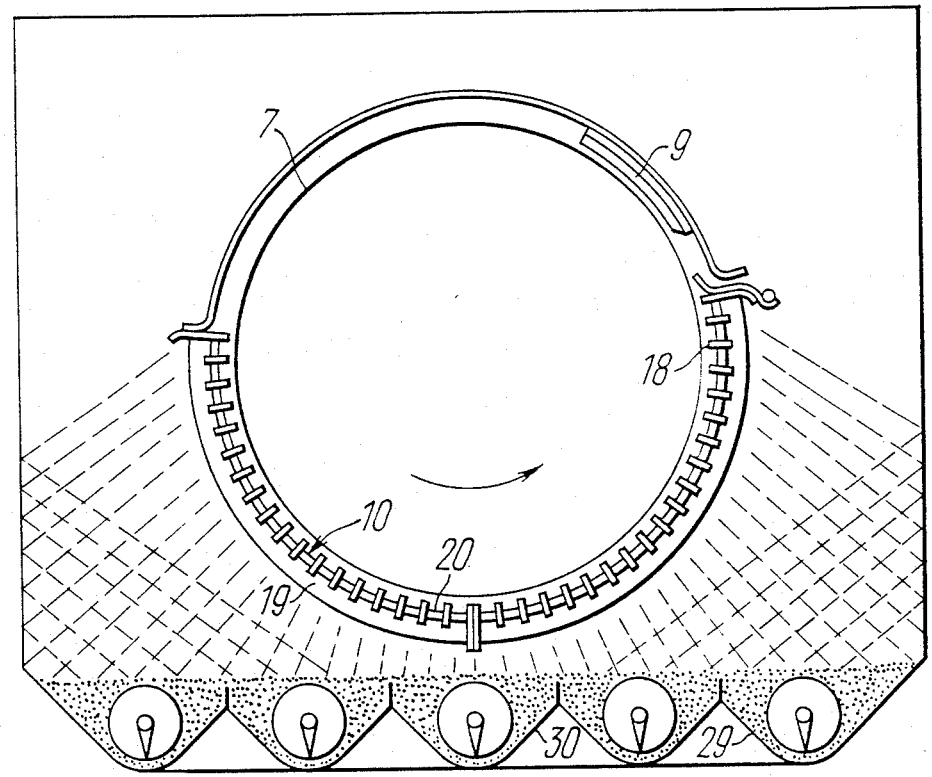
FIG. 5 is a diagram representing the distribution of threshed product over a width of a conveyor of the combine.

The working elements of the rotor 7 grip a portion of the material to be threshed, impart a helical motion to it in the direction of rotation of the rotor 7 (FIG. 2) and in cooperation with the bars 18 of the concave 10 rub it to separate grain therefrom (FIG. 5).

An intense sifting of the material by the concave 10 starts already at the beginning of the threshing zone over the entire wrap angle between the rotor 7 and concave 10.

When passing along a helical path through the threshing zone, the crop material being threshed is subjected to repeated actions of the working elements of the rotor 7 and the bars 18 of the concave 10 which are not equal and depend on the size of the threshing clearance between the rotor 7 and the concave 10. The intensity of sifting the material by the concave 10 with respect to the longitudinal axis of the rotor 7 is different.

The intensity of sifting is higher in the decreasing threshing clearance due to an increase in the speed of the threshed material moving over the concave 10 towards the outlet therefrom, which results in distribution of the material being threshed and its active cooperative interaction with the bars 18 of the concave 10. When the material being threshed moves towards the increasing threshing clearance over the concave 10, its speed slows down, its layer becomes deeper, looser and more porous, and its cooperative interaction with the bars 14 of the rotor 7 results in an intensive shaving of grain out of the crop material and in a better separation of the grain by the concave 10.

More even loading of the sieve of the cleaning mechanism over its width stabilizes operation of the cleaning mechanism 12, reduces losses of grain and increases grain output of the axial flow combine.

What is claimed is:

1. An axial flow combine comprising:
    a rotating rotor having an axis arranged along the direction of combine movement;
    a stationary cylindrical casing embracing said rotor;
    helical guide fins mounted in the upper part of said casing;
    a grate-type concave mounted in a threshing zone in the lower part of said casing;
    said concave made with openings of different open area;
    a portion of said concave having openings of smaller size, which concave is defined, with respect to the direction to combine movement, by a front edge of said concave and an imaginary extension of a helical line extending inwardly from said guide fins onto said concave, said portion of said concave increasing in transverse extent in the direction of rotation of said rotor, the remainder of said concave having openings of larger size;
    a conveyor mounted under said concave to transport threshed product separated through said concave; and
    a cleaning mechanism installed adjacent to the conveyor.

2. An axial-flow combine as claimed in claim 1, in which said portion of said concave having said openings of smaller size enlarges stepwise in the direction of rotation of said rotor and in the direction opposite to the direction of combine movement.

3. An axial-flow combine as claimed in claim 2, said portion of said concave having said openings of smaller size is defined by two steps arranged on either side of a longitudinal axis of said rotor and having lengths amounting, respectively, to one third and two thirds of a pitch of said helical line of said guide fins.

* * * * *